United States Patent
Kiessling et al.

(10) Patent No.: US 6,746,716 B2
(45) Date of Patent: Jun. 8, 2004

(54) PROCESS FOR COATING A CARRIER STRUCTURE

(75) Inventors: Ralph Kiessling, Limeshain (DE); Michael Harris, Münster (DE); Dieter Detterbeck, Alzenau (DE); Josef Piroth, Mespelbrunn (DE)

(73) Assignee: OMG AG & Co KG, Hanau-Wolfgang (DE)

( * ) Notice: Subject to any disclaimer, the term of this patent is extended or adjusted under 35 U.S.C. 154(b) by 0 days.

(21) Appl. No.: 10/184,265

(22) Filed: Jun. 27, 2002

(65) Prior Publication Data

US 2003/0044520 A1 Mar. 6, 2003

(30) Foreign Application Priority Data

Jun. 30, 2001 (EP) .............................. 01115981

(51) Int. Cl.⁷ .............................. B05D 7/22; B05D 3/02; B05D 3/12; B05D 1/18
(52) U.S. Cl. ................ 427/230; 427/430.1; 427/443.2; 427/235; 427/239; 427/238; 427/379; 427/294; 427/350
(58) Field of Search ............................ 427/430.1, 443.2, 427/230, 235, 238, 379, 372, 2, 294, 350, 239

(56) References Cited

U.S. PATENT DOCUMENTS

| | | | | |
|---|---|---|---|---|
| 4,039,482 A | * | 8/1977 | Hoyer et al. ................ 502/332 |
| 4,208,454 A | * | 6/1980 | Reed et al. ................ 427/238 |
| 4,609,563 A | * | 9/1986 | Shimrock et al. ............... 427/8 |
| 5,165,970 A | * | 11/1992 | Schmidt et al. .......... 427/430.1 |
| 5,866,210 A | | 2/1999 | Rosynsky et al. |
| 6,149,973 A | * | 11/2000 | Foerster et al. ............. 427/235 |
| 6,548,105 B2 | * | 4/2003 | Kiessling et al. ............... 427/8 |

FOREIGN PATENT DOCUMENTS

| | | |
|---|---|---|
| EP | 0 672 454 A | 9/1995 |
| EP | 0 941 763 A | 9/1999 |
| WO | WO 01/10573 A | 2/2001 |

\* cited by examiner

Primary Examiner—Michael Barr
(74) Attorney, Agent, or Firm—Kalow & Springut LLP (57) ABSTRACT

The invention provides a process for coating a cylindrical carrier structure with a predetermined amount (target take-up) of a coating suspension, wherein the carrier structure has a cylinder axis, two end faces, an encasing face and an axial length L and a large number of channels running from the first end face to the second end face. The process comprises: a) vertically aligning the cylinder axis of the carrier structure and filling the empty volume of the channels up to a predetermined height $H_1$ starting from the lower end face, b) removing the excess coating suspension through the lower end face of the carrier structure down to the target take-up, c) turning the carrier structure 180°, so that the upper and lower end faces are exchanged one for the other, and d) repeating steps a) and b), wherein the height $H_2$, up to which the channels are filled in this case is given by $H_2 = L - x \cdot H_1$ where x is between 0.8 and 1.0.

11 Claims, 6 Drawing Sheets

PROCESS FOR COATING A CARRIER STRUCTURE

BACKGROUND OF THE INVENTION

The invention provides a process for coating a cylindrical carrier structure with a coating suspension. In particular, the invention provides a process for coating carrier structures for catalysts, for example car exhaust gas catalysts.

The carrier structures for car exhaust gas catalysts are cylindrical with two end faces and an encasing face and a number of flow channels for the exhaust gases of the internal combustion engines which are parallel to the cylinder axis running from the first end face to the second end faces. The carrier structures are also called honeycomb structures.

The cross-sectional shape of the carrier structures depends on the requirements for building it into the vehicle. Carrier structures with a round, elliptical or triangular cross-section are widely used. The flow channels mostly have a square cross-section and are arranged in a tight grid over the entire cross-section of the carrier structure. Depending on the particular application, the channel density or cell density of the flow channels varies between 10 and 140 $cm^{-2}$. Honeycomb structures with cell densities up to 250 $cm^{-2}$ and higher are under development.

Catalyst carrier structures which are obtained by the extrusion of ceramic materials are largely used for the treatment of car exhaust gases. Alternatively, catalyst carrier structures consisting of corrugated and rolled up metal foils are available. Currently, ceramic carrier structures with cell densities of 62 $cm^{-2}$ are still used extensively for the treatment of exhaust gases in private motor vehicles. In this case, the cross-sectional dimensions of the flow channels are 1.27×1.27 $mm^2$. The thickness of the walls in such carrier structures is between 0.1 and 0.2 mm.

In general, very finely divided platinum group metals are used, the catalytic effect of which can be modified by compounds of base metals, to convert the harmful substances present in car exhaust gases, such as carbon monoxide, hydrocarbons and nitrogen oxides, into harmless compounds. These catalytically active components have to be deposited onto the carrier structures. However, it is not possible to ensure the required extremely fine distribution of catalytically active components by the deposition of these components on the geometric surface areas of the carrier structures. This applies equally to non-porous metallic and to porous ceramic carrier structures. A sufficiently large surface area for the catalytically active components can only be made available by applying a support layer made of finely divided high surface area materials to the internal faces of the flow channels. This process is called coating the carrier structure. Coating the outer encasing face of the carrier structures is undesirable and should be avoided in order to avoid the loss of valuable catalytically active materials.

A suspension of the finely divided high surface area materials in a liquid phase, usually water, is used to coat the carrier structures. Typical coating suspensions for catalytic applications contain, as high surface area support materials for the catalytically active components, for example active aluminum oxides, aluminum silicates, zeolites, silicon dioxide, titanium oxide, zirconium oxide and oxygen-storing components based on cerium oxide. These materials form the solids fraction of the coating suspension. In addition, soluble precursors of promoters or catalytically active noble metals from the platinum group in the Periodic System of Elements may also be added to the coating suspension. The solids content of typical coating suspensions is in the range between 20 and 65 wt. %, with respect to the total weight of the suspension. The density is between 1.1 and 1.8 kg/l.

A number of processes for depositing the support layer on the carrier structures using a coating suspension or slurry is known from the prior art. For coating purposes, the carrier structures, may be for example immersed in the coating suspension or the coating suspension may be poured over the carrier structures. Furthermore, there is the possibility of pumping or sucking the coating suspension into the channels in the carrier structures. In all cases, excess coating material has to be removed from the channels in the carrier structure under suction or by blowing out with compressed air. Any channels blocked with coating suspension are opened up by this means.

After the coating procedure, the carrier structure and support layer are dried and then calcined to solidify and fix the support layer to the carrier structure. Then the catalytically active components are introduced to the coating by impregnating with mostly aqueous solutions or precursor compounds of the catalytically active components. As an alternative, the catalytically active components may also be added to the coating suspension itself. Subsequent impregnation of the final support layer with catalytically active components is not required in this case.

An essential criterion for the coating process is the coating or loading concentration which can be achieved therewith in one working stage. This is understood to be the proportion of solids which remains on the carrier structure after drying and calcining. The coating concentration is given in grams per liter volume of the carrier structures (g/l). In practice, coating concentrations of up to 300 g/l are required in car exhaust gas catalysts. If this amount cannot be applied in one working stage with the process used, then the coating procedure has to be repeated, after drying and optionally calcining the carrier structure, often enough to achieve the desired loading. Frequently, two or more coating procedures using coating suspensions of different composition are performed. Catalysts which have several superimposed layers with different catalytic functions are obtained in this way.

Another criterion for the quality of a coating is its uniformity, in both the radial and axial direction of the carrier structure. Irregularities in the axial direction cause particular problems because they can lead at high target loadings to pressure losses which can no longer be tolerated.

It is known in the art that one way to achieve uniformity in the coating of a catalyst carrier structures in honeycomb form also called honeycomb structures is to vertically align the cylindrical axis of the honeycomb structure so the coating suspension is pumped into the channels through the lower end face of the honeycomb structure until it emerges from the upper end face. Then, the coating suspension is again pumped out downwards and excess coating suspension is removed from the channels by blowing out or under suction in order to avoid blocking the channels. Using this process, support layers are obtained which have high uniformity over the entire length of the honeycomb structure.

Other ways to coat ceramic honeycomb structures are known in the art. For example, a previously determined amount of a coating suspension is placed in a flat vessel and one end face of the honeycomb structure to be coated is dipped into the suspension. The previously determined amount of coating suspension corresponds to the target amount of coating for the honeycomb structures. Then the entire amount of coating suspension is pulled into the flow channels of the honeycomb structure under suction by applying a vacuum to the second end face. Since the previously determined amount of coating suspension corresponds to the target amount of coating for the honeycomb structures, no removal of excess coating suspension from the flow channels is required after introducing the coating suspension under suction. Coating is preferably performed in two steps, wherein in a first step 50 to 85% of the amount of coating required is introduced to the flow channels under suction from the first end face and the remaining amount of coating is introduced from the second end face of the honeycomb structure. This process results in a high degree of reproducibility for the coating concentration. However, the catalysts produced in this way exhibit a steep gradient in the thickness of the coating along the honeycomb structure. Also, the preferred method for coating the honeycomb structure in two steps does not sufficiently improve the uniformity of the coating along the honeycomb structure.

It is known in the art that for certain applications, catalysts are required which have different catalytically active regions along the catalyst carrier structure. For example, a catalyst which consists of two partial catalysts, a catalyst at the inflow end for the selective catalytic reduction of nitrogen oxides by ammonia or an ammonia-donating compound and an oxidation catalyst at the outflow end, wherein the oxidation catalyst is applied as a coating to the section at the outflow end of a one-piece reduction catalyst specified as a full extrudate in honeycomb form and the outflow section makes up 20 to 50% of the total catalyst volume. Application of the oxidation catalyst is performed by immersing the desired length of the outflow end of the honeycomb structure in the coating suspension for the oxidation catalyst.

The prior art also proposes reinforcing the end faces of monolithic catalysts for exhaust gas treatment by the application or incorporation of inorganic substances which reinforce the mechanical properties of the carrier structures or catalytic coating. The length of the reinforced zone, starting from the end face concerned, is up to twenty times the diameter of a channel. To perform this coating procedure, it is suggested that the catalyst structures be immersed in a suspension of the reinforcing substance or that this suspension be sprayed onto the end faces of the structures.

A process for the partial coating of honeycomb structures or carrier structures has also been proposed. For coating purposes, one end face of the substrate is immersed in a bath containing the coating suspension. The bath contains more coating suspension than the amount to coat the substrate up to a desired height. Then a reduced pressure is applied to the second end fact, the strength and duration of this being sufficient to draw the coating suspension in the channels up to the required height. Efforts are made to achieve the same coating in all the channels.

This process has several distinct disadvantages. The height of the coating and its axial length is determined by the use of capillary forces and the size of the reduced pressure applied and by the time during which the reduced pressure is applied to the second end face of the carrier structure. Periods of 1 to 3 seconds are cited for this. Thus, changes in the viscosity of the coating suspension lead to direct changes in the length of coating applied. The strength of the reduced pressure applied is a maximum of one inch of a water column, which corresponds to about 2.5 mbar. Accurate control of this small reduced pressure is also difficult and can lead to further problems with the reproducibility of the coating process. Due to the low reduced pressure, only coating suspensions with a low viscosity can be processed using this method, which means that these suspensions generally have only a low solids content. Again, the low solids content means that several coating procedures have to be performed in sequence in order to apply a high loading concentration. In this process capillary forces play an essential part. This makes the process dependent on the cell density of the carrier structures being coated.

Based of the foregoing, there is a need in the art for a process for coating carrier structures with coating suspensions having a high solids content that ensure high uniformity of the coating thickness in the axial direction of the carrier structure.

SUMMARY OF THE INVENTION

The present invention provides a process for coating a cylindrical carrier structure with a predetermined amount (target take-up) of a coating suspension, wherein the carrier structure has a cylinder axis, two end faces, an encasing face and an axial length L and a number of channels running from the first end face and the second end face. The process comprises the following process steps:

a) vertically aligning the cylinder axis of the carrier structure and filling the empty volume of the channels up to a predetermined height $H_1$ starting from the lower end face;

b) removing the excess coating suspension through the lower end face of the carrier structure down to the target take-up;

c) turning the carrier structure 180°, so that the upper and lower end faces are exchanged one for the other; and d) repeating steps a) and b), wherein the height $H_2$, up to which the channels are filled is given by $H_2 = L - x \cdot H_1$ where x is between 0.8 and 1.0.

The proposed process thus includes two coating steps or coatings which are introduced into the channels from opposite end faces of the carrier structure.

Target take-up in the context of this invention is understood to be the amount of coating suspension which is meant to remain on the structure after the completion of coating. Since the process includes two coating steps, the target take-ups for the first and second coating steps have to be differentiated. The two values together give the target take-up for the entire coating process.

For a better understanding of the present invention together with other and further advantages and embodiments, reference is made to the following description taken in conjunction with the examples, the scope of which is set forth in the appended claims.

BRIEF DESCRIPTION OF THE FIGURES

Preferred embodiments of the invention have been chosen for purposes of illustration and description, but are not intended in any way to restrict the scope of the invention. The preferred embodiments of certain aspects of the invention are shown in the accompanying figures, where.

DETAILED DESCRIPTION OF THE INVENTION

The invention will now be described in connection with preferred embodiments. The embodiments are presented to aid in an understanding of the present invention and are not intended to, and should not be construed to, limit the invention in any way. All alternatives, modifications and equivalents which may become obvious to those of ordinary skill on reading the disclosure are included within the spirit and scope of the present invention.

This disclosure is not a primer on the process for coating carrier structures, basic concepts known to those skilled in the art have not been set forth in detail.

It is a characteristic of the process that the channels in each coating step are completely filled with coating suspension up to the relevant coating height. Thus, in contrast to the processes known from the prior art, the coating suspension is used in excess. Excess coating suspension is removed from the channels each time through the lower end face. This procedure has the advantage when coating ceramic honeycomb structures, for example, that the absorption capacity of porous ceramic for the aqueous phase in the coating suspension exerts only a small influence on the solids concentration of the coating suspension filling the channels. This has a positive effect on axial uniformity of the coating thickness. Another improvement is produced in that the excess coating suspension is removed downwards, that is along channel walls already in contact with the coating suspension. This results in further leveling of the coating thickness in the axial direction. If, however, in accordance with the prior art, only just the correct amount of coating dispersion which corresponds to the coating thickness required were applied, then when raising the coating suspension into the channels, increasing concentration of the coating suspension takes place due to the absorption capacity of the carrier structure. According to the experience of the inventors, the thickness of the coating on a carrier structure coated in this way increases along the channels with increasing distance from the end face. Although this effect can be reduced to a certain extent by two partial coatings, one from each end face of the carrier structure, it cannot be tolerated for many applications in car exhaust gas catalysis.

Another improvement in the uniformity of the coating thickness is produced by the process, according to the invention, in that the rate at which the coating suspension is introduced into the carrier structure is such that the desired coating height is reached in less than one second and removal of the excess coating suspension takes place immediately after reaching the coating height. This reduces the effect of the absorption capacity of the ceramic catalyst support on the coating suspension.

The filling amount introduced into the channels in the carrier structure is obtained from the volume of coating suspension which corresponds to the empty volume of the channels being filled, up to the desired coating height, multiplied by the density of the coating suspension. The filling amount has to be differentiated from the desired coating amount (target amount of coating or target take-up) which is obtained only after removing the excess coating suspension from the channels in the carrier structure. Thus, the amount of coating suspension introduced into the support is always greater than the coating amount.

The following example explains this point: a honeycomb structure with a volume of 1.5 liters and a cell density of 62 $cm^{-2}$ is coated to half its length, from one end face, in a first coating step. The empty volume of the honeycomb structure (volume of all the channels) is ⅔ the total volume, that is 1 liter. Therefore, the filling volume up to half the length of the honeycomb structure is 0.5 liters. A coating suspension with a density of 1.5 kg/l and a solids content of 50 wt. % is used for the coating process. A filling amount of 750 g is calculated from this figure and the filling volume required. After removing excess coating suspension, an amount of coating (target take-up) of 200 g remains on the carrier structure and this results in a dry weight 100 g after calcination. Thus the target take-up of 200 g is only a fraction of the filling amount of 750 g.

Filling the empty volume in the channels of the carrier structure up to the filling heights $H_1$ and $H_2$ with coating suspension is performed in a controlled manner, volumetrically, gravimetrically or using a sensor, with the aid of a metering instrument. Suitable metering instruments are, for example, a pump or a valve. If metering is performed volumetrically, then a metering pump may be used, for example, wherein the volume pumped is measured by time-control of the pump or by the number of pumping processes (e.g. number of revolutions of a rotary pump). For gravimetric metering, a mass flowmeter can be used. The mass flowmeter then controls the metering device, that is the pump or the metering valve. Particularly advantageous metering is possible when the carrier structure is made of ceramic. Then, for example a capacitive sensor can be mounted laterally on the casing of the carrier structure, at the desired coating height above the lower end face. The metering device is controlled by the signal from the capacitive sensor. Naturally, alternative sensor arrangements to determine the coating height can also be used, wherein optical sensors in particular facilitate advantageous solutions.

Removal of excess coating suspension from the channels in the carrier structure is performed down to the desired target take-up which consequently is always less than the filling amount introduced into the channels. Process step b), that is removal of excess coating suspension down to the target take-up, can be performed in one working step by applying suction or by blowing out. If, however, excess coating suspension is first pumped out of the flow channels roughly using a pump, this has to be followed by suction or blowing to get down to the target take-up. Thus, in this case, process step b) is divided into two sub-steps. In the first sub-step, the excess coating suspension is roughly pumped out. In the second sub-step, the target take-up is achieved by suction or blowing.

After removing excess coating suspension in step d), the coating is dried and optionally calcined. Drying is generally performed at an elevated temperature from about 80° C. to about 200° C. for a period of 5 minutes to 2 hours. Calcination is usually performed at temperatures from about 300° C. to about 600° C. for a period of 10 minutes to 5 hours. Calcination results in effective fixing of the coating to the carrier structure and converts any precursor compounds in the coating suspension into their final form.

When performing the coating procedure in step d), the coating height is chosen in such a way that either it corresponds precisely with the part of the carrier structure still not coated in the first step or it overlaps the previous coating by up to 20% of the total length of the carrier structure. Since the first coating is still in the moist state during the second coating process, this overlapping does not lead to substantial thickening of the coating thickness in the overlapping region. In addition, excess coating suspension is finally pumped out or removed under suction or blown out.

For certain applications, however, it may be advantageous to perform an intermediate drying step at elevated temperature after step b), that is the first coating is dried before applying the second coating. This is especially advantageous when a coating suspension with a different composition and function from that in step a) is used for the second coating process (step d)).

Figure 1:
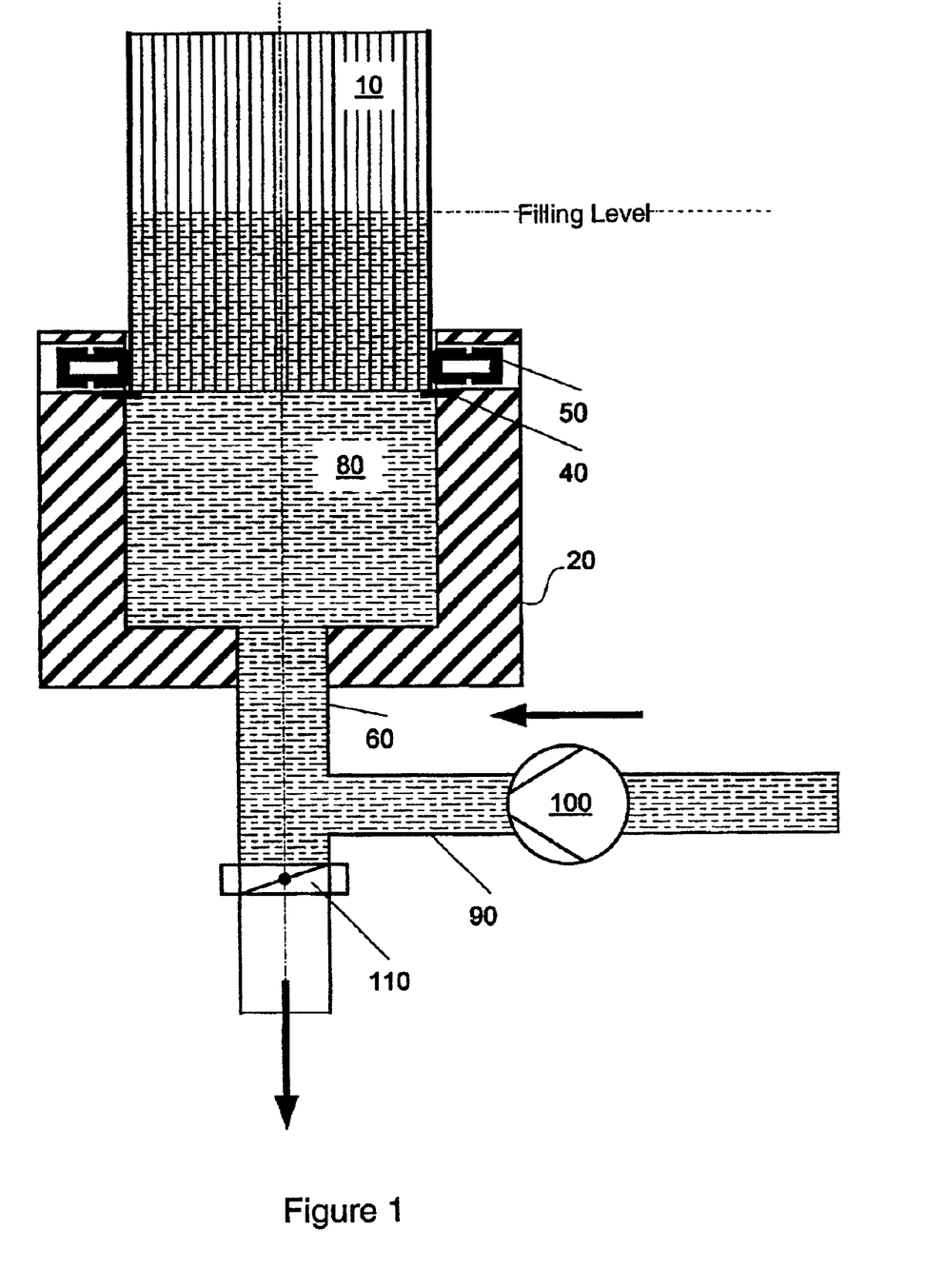
FIG. 1 illustrates a device for performing the process with a metering pump and the removal of excess coating suspension under suction.
Figure 2:
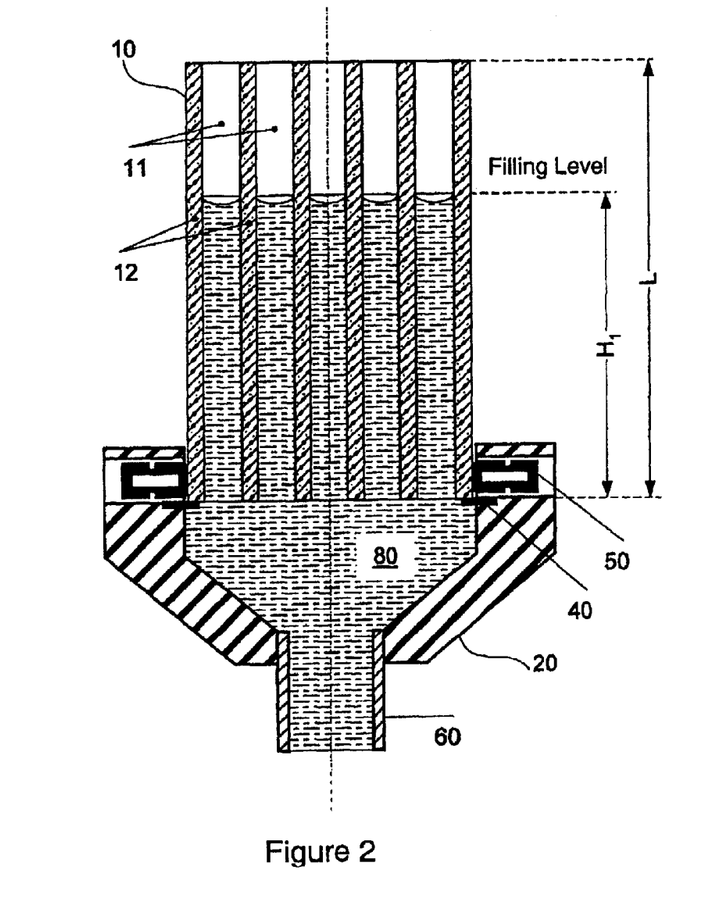
FIG. 2 illustrates a coating device with a honeycomb structure after completion of the first filling process.
Figure 3:
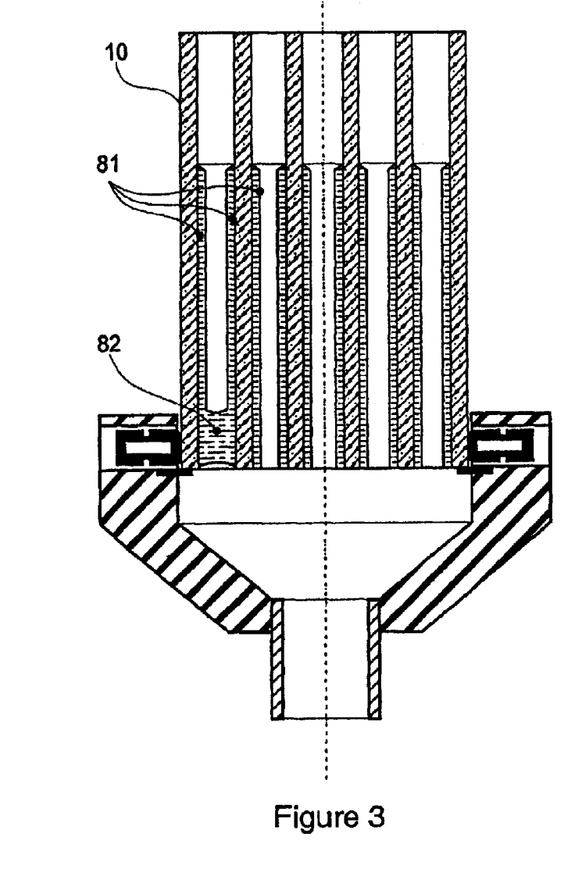
FIG. 3 illustrates a coating device with a honeycomb structure after the removal of excess coating suspension, but before blowing out or suction of the honeycomb structure to achieve the target take-up.
Figure 4:
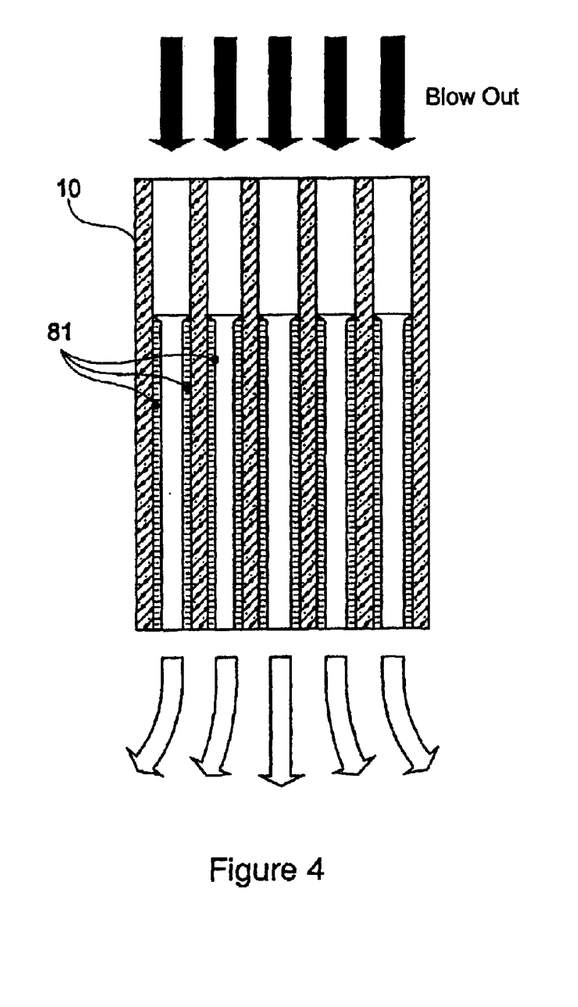
FIG. 4 illustrates a schematic diagram of blowing out the honeycomb structure to achieve the target take-up.
Figure 5:
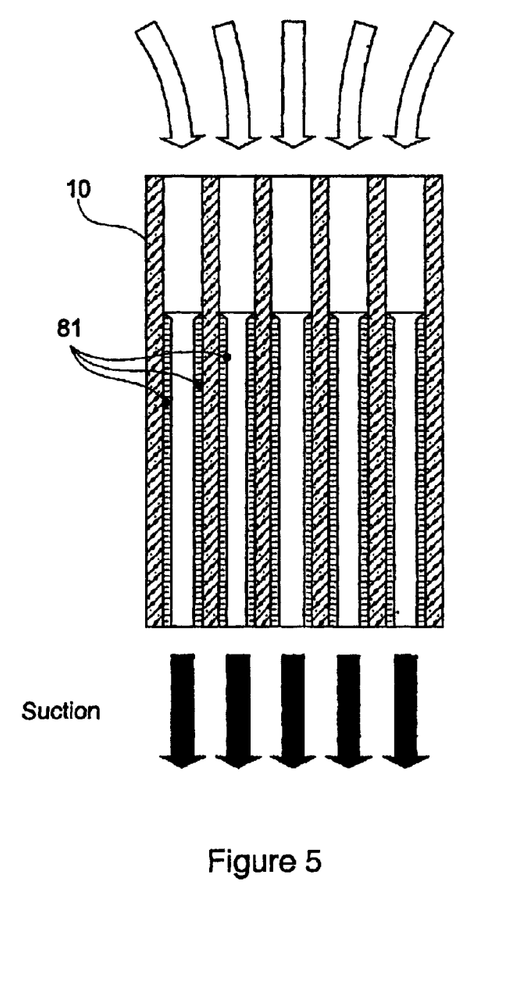
FIG. 5 illustrates a schematic diagram of applying suction to the honeycomb structure to achieve the target take-up.
Figure 6:
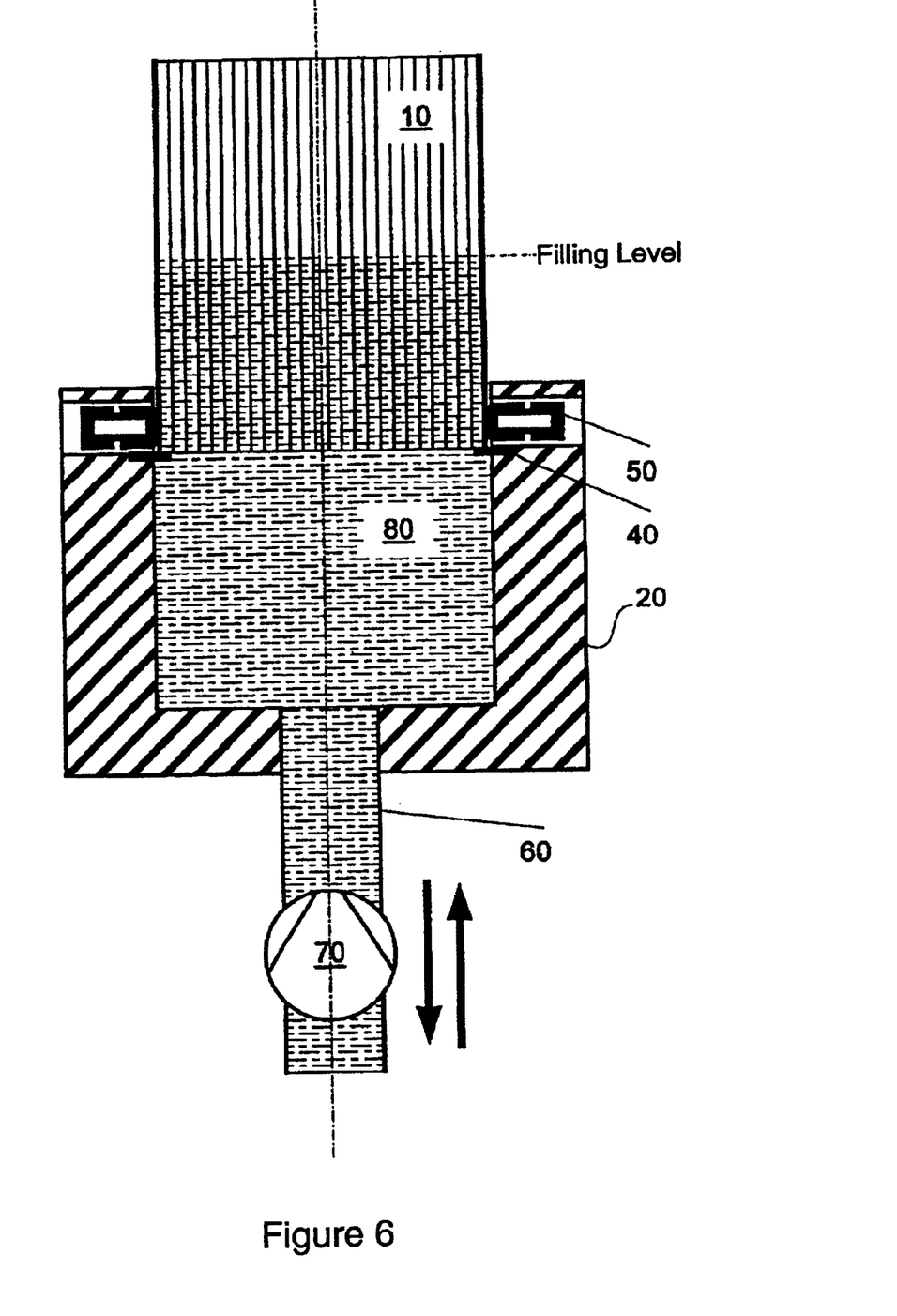
FIG. 6 illustrates a device for performing the process with a reversible metering pump.
Figure 7:
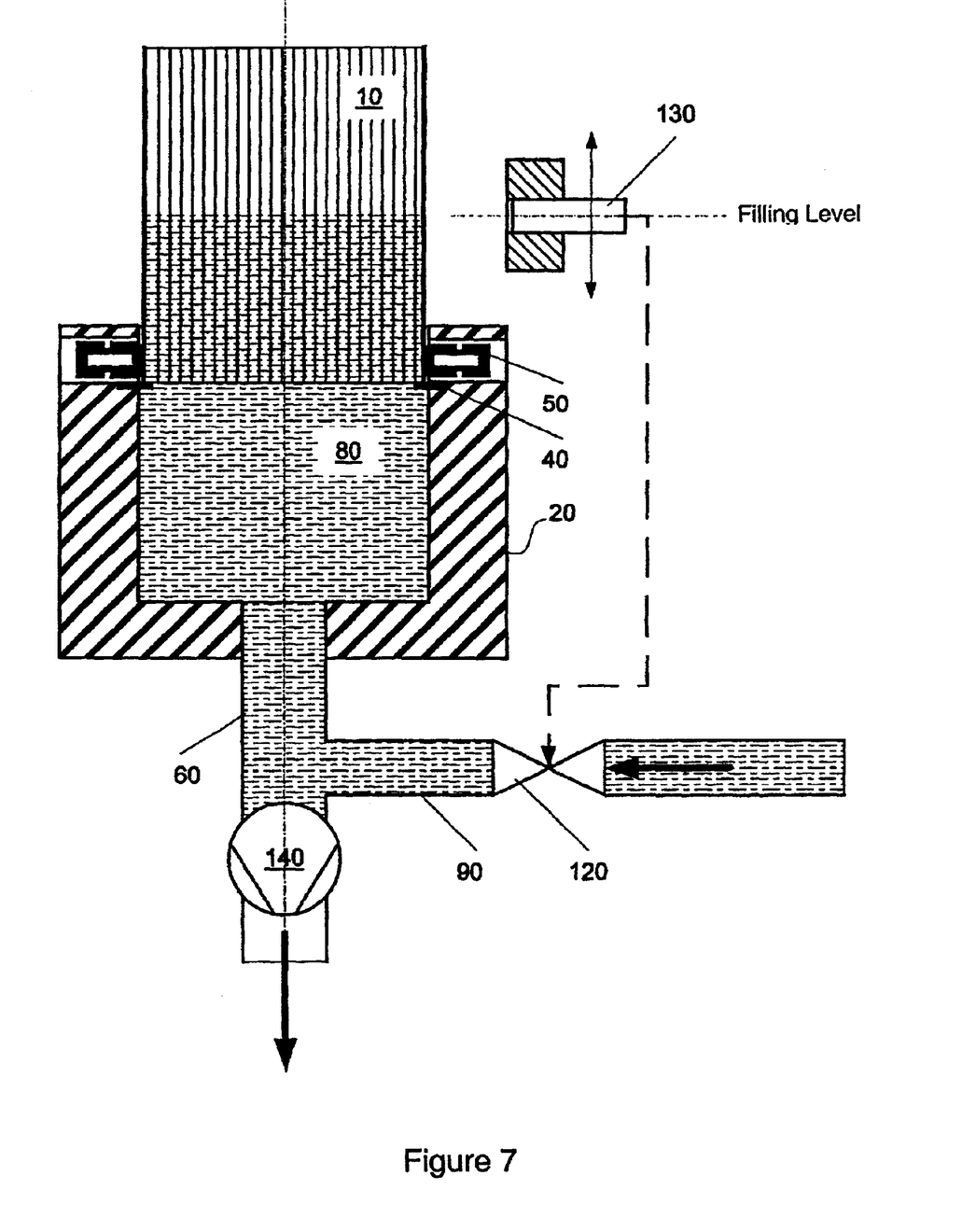
FIG. 7 illustrates a device for performing the process with a metering valve and a pump for pumping out excess coating suspension.
Figure 8:
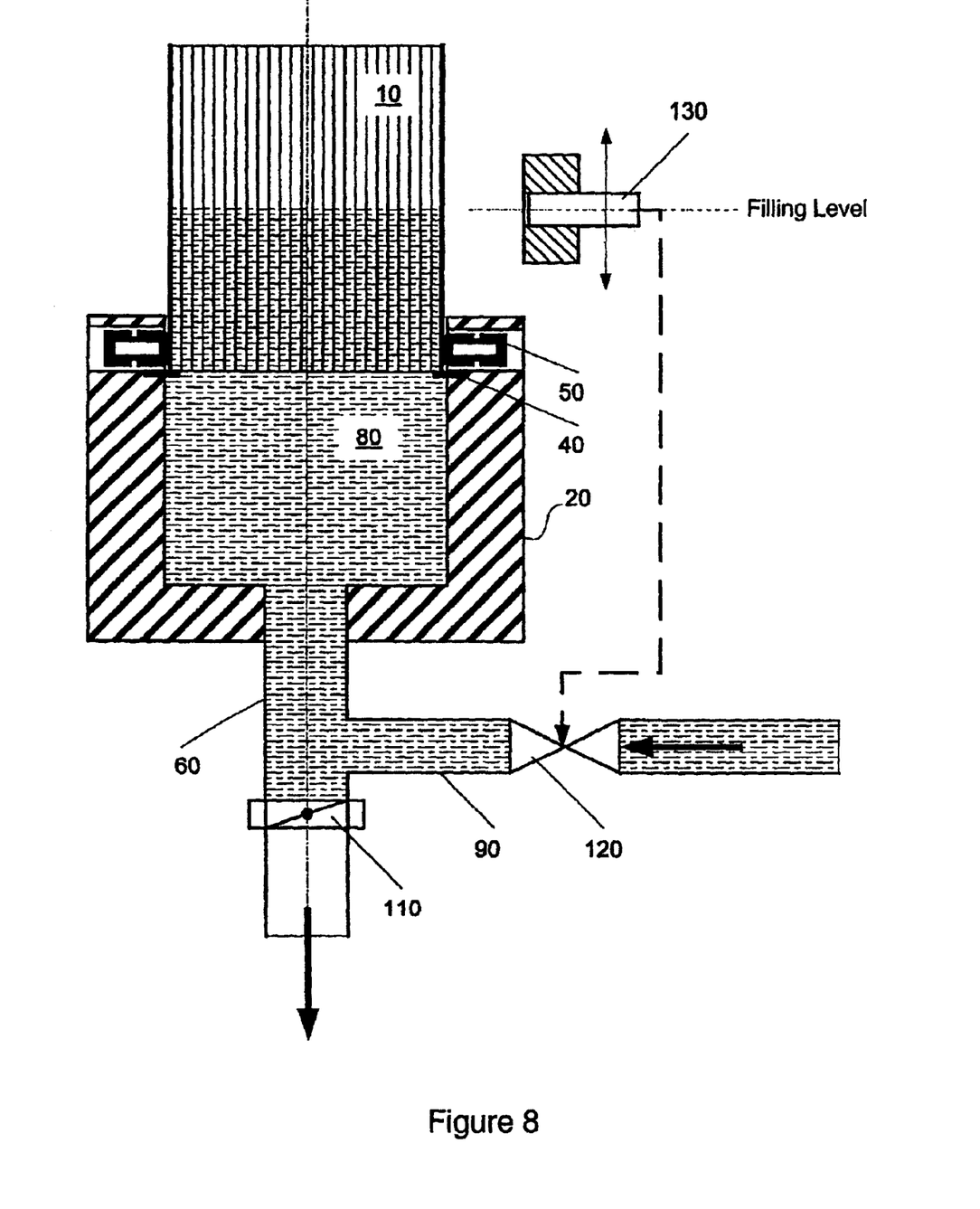
FIG. 8 illustrates a device for performing the process with a metering valve and the application of suction to remove excess coating suspension.

FIGS. 1 through 8 are used to further explain the process according to the invention. FIG. 1 shows a device for performing the process with a metering pump and the removal of excess coating suspension under suction. FIG. 2 shows a coating device with a honeycomb structure after completion of the first filling process. FIG. 3 shows a coating device with a honeycomb structure after the removal of excess coating suspension, but before blowing out or suction of the honeycomb structure to achieve the target take-up. FIG. 4 shows a schematic diagram of blowing out the honeycomb structure to achieve the target take-up. FIG. 5 shows a schematic diagram of applying suction to the honeycomb structure to achieve the target take-up. FIG. 6 shows a device for performing the process with a reversible metering pump. FIG. 7 shows a device for performing the process with a metering valve and a pump for pumping out excess coating suspension. FIG. 8 shows a device for performing the process with a metering valve and the application of suction to remove excess coating suspension.

Either ceramic or metallic carrier structures can be coated with the process.

FIG. 1 shows one possible apparatus for performing the process. The coating equipment consists of a coating station (20), on which the carrier structure to be coated (10) is placed using the holding elements (40) provided for this purpose. The carrier structure is fixed to the station and sealed by blowing up the inflatable rubber ring-seal (50). In FIG. 1, the metering device for introducing the coating suspension into the channels of the carrier structure is represented by metering pump (100) which pumps the coating suspension (80) out of a storage vessel (not shown here) via pipes (90) and (60) from below into the carrier structure. The filling heights $H_1$ and $H_2$ are determined by pumping in corresponding volumes of the coating suspension using the metering pump.

Excess coating suspension is removed from the channels in the carrier structure under suction by opening the butterfly valve (110). For this purpose, pipe (60) is connected to a reduced pressure vessel with demister, not shown here.

By using two separate pipes for filling and emptying the carrier structure, a circular flow for the coating suspension can be created in a simple manner. The reduced pressure vessel is connected to a fan which maintains a reduced pressure between 50 and 500, preferably 300 mbar. The intensity and duration of the suction process can be adjusted using the butterfly valve. These factors determine, inter alia, the amount of coating suspension remaining on the carrier structure, that is the target take-up. In addition, this process is used to open up any channels which may have been blocked by excess coating suspension.

Finally, the rubber ring-seal (50) is loosened and the carrier structure is turned through 180° and the second end face is placed on the coating station. Then the coating process is repeated, wherein the coating height $H_2$ corresponds to the equation $$H_2 = L - x \cdot H_1$$

where x is chosen to be between 0.8 and 1.0.

In the case just described, one and the same coating station is used for both coating steps. Naturally, to double the throughput, a second coating station may be provided for the second coating step. In this case, the carrier structure is turned through 180° during transport from the first coating station to the second coating station.

FIGS. 2 to 5 are used to explain the expressions filling height, filling volume and target take-up used in the context of this invention. FIG. 2 shows a coating device with a ceramic honeycomb structure of length L after completion of the first filling process. Reference number (11) denotes the channels in the honeycomb structure and reference number (12) the separating walls between the channels. Honeycomb structure (10) has been filled up to the desired filling height $H_1$ with coating suspension (80) through the lower end face. The filling height is the distance from the lower end face of the honeycomb structure up to the level of the surface of the liquid in the channels. The filling volume corresponds to the empty volume of the channels from the lower end face up to the filling height $H_1$. The filling amount, or filling mass, is obtained by multiplying the filling volume by the density of the coating suspension.

FIG. 3 shows the situation after emptying the excess coating suspension through the lower end face. Coating (81) is left on the channel walls. (82) denotes undesired blockage of one of the channels. To open up any blocked channels and to adjust the amount of coating to the desired target take-up, the honeycomb structure is either blown out with compressed air or is subjected to a suction process, after emptying. This is shown schematically in FIG. 4 (blowing out) and FIG. 5 (suction). The power of the blowing out or suction processes and the duration of these processes until target take-up is achieved can be determined by a person skilled in the art in a few preliminary trials.

After suction or blowing out only the coating (81) in which the amount of coating corresponds to that of the desired target take-up still remains on the channel walls. As can be seen by comparing FIG. 2 with FIG. 4 or FIG. 5, the target take-up, that is the amount of coating suspension remaining on the channel walls is substantially less than the filling amount.

In the coating device according to FIG. 1, the removal of excess coating suspension from the channels in the carrier structure down to the target take-up is performed in one working stage by removing the coating suspension downwards under suction.

The apparatus in FIG. 6 is designed for an alternative process management scheme. Filling and emptying now takes place through only one pipe (60) with the aid of a reversible metering pump (70). The coating suspension is pumped into the channels in the carrier structure with the aid of metering pump (70). Fixing the coating heights thus also takes place here by using the metering pump. Excess coating suspension is removed from the channels by reversing the pumping direction of the pump. Then the carrier structure is taken out of the coating station and the target take-up is set in another processing station using suction or blowing (see FIGS. 4 and 5). Then the carrier structure is turned through 180° and placed on a second coating station to perform the second coating step.

Improved reproducibility of the coating height can be achieved when the filling volume is measured using a metering valve at the inlet of which the coating suspension is under pressure. The metering valve is controlled by the signal from a sensor. The signal from the sensor registers that the desired coating height has been achieved and controls closure of the metering valve. Excess coating suspensions can be removed from the channels in the carrier structure again by pumping out or by applying suction.

The process variants described hitherto are suitable for carrier structures made of ceramic or carrier structures made of metal foil. A particularly advantageous embodiment is possible for carrier structures made of ceramic when sensors are used to determine the coating height. Reaching the coating height in this case can be registered very easily and accurately with the aid of a capacitive sensor which is arranged at the desired height above the lower end face of the carrier structure and slightly removed from the encasing surface of the carrier structure. Capacitive sensors are used to a large extent in industry as proximity switches. The capacitive sensor can be located at the desired height and slightly removed from the encasing surface of the carrier structure. If the coating suspension in the flow channels rises to this height, then the sensor responds. The accuracy of response depends on the change in dielectric constant. If an aqueous suspension is used, then the accuracy of response is very high because in this case the dielectric constant changes from 1 (air) to about 80 (water). The turn-off accuracy which can be produced is exceptional with this type of sensor arrangement.

The distance between the encasing surface and the sensor head should be in the range between 0.5 and 25 mm. The carrier structure should not be screened by a metal surface located between the encasing surface and the sensor. In this case, it is recommended that the holder for the carrier structure be made of a plastics material. In trials, it has been shown that extraordinarily good turn-off accuracies are still produced when the distance between the encasing surface of the carrier structure and the sensor head is 15 mm. A plastic wall inserted between the encasing surface and the sensor head has no effect on the turn-off accuracy. This fact provides a person skilled in the art with a high degree of latitude when constructing a suitable coating station to perform the process.

One possible apparatus for performing this process variant is shown in FIGS. 7 and 8. A metering valve (120) is now introduced into pipe (90). The capacitive sensor (130) is fixed at the desired coating height above support (40) and the sensor signals when the coating suspension in the flow channels has risen to this height. The sensor is connected to metering valve (120) by a suitable electronics control system. When the sensor signals that the coating height has been reached then the electronics system closes the metering valve and switches on the pump (140) to pump out excess coating suspension (FIG. 7) or opens butterfly valve (110) which is connected to a reduced pressure vessel, as shown in FIG. 1, to remove coating suspension from the channels in the carrier structure under suction (FIG. 8).

According to the proposed process, the coating suspension has to be introduced into the carrier structure from below. Filling is complete only when the intended coating height is reached. That makes the process largely independent of the viscosity of the suspension. Thus, high-viscosity coating suspensions with a high solids content can also be used, so it is possible to achieve the coating thickness required with only one coating process. The viscosity of the coating suspension can be up to 1000 mPa·s. Suspensions with a solids content of up to 65 wt. % can be processed. Coating suspensions with a solids content 40 and 55 wt. % are preferably used. In general, only one coating process per catalytically active layer is required in order to apply coating concentrations after calcinations of up to 200 g/l of coated carrier structure volume.

While the invention has been described in connection with specific embodiments thereof, it will be understood that it is capable of further modifications and this application in intended to cover any variations, uses, or adaptation of the invention following, in general, the principles of the invention and including such departures from the present disclosure as come within known or customary practice within the art to which the invention pertains and as may be applied to the essential features hereinbefore set forth and as follows ion the scope of the appended claims.

What is claimed:

1. A process for coating a cylindrical carrier structure with a predetermined amount of target take-up of a coating suspension, wherein the predetermined amount of target take-up is comprised of a first amount of target take-up and a second amount of target take-up, the carrier structure has a cylinder axis, two end faces, wherein said two end faces comprise a lower end face and an upper end face, an encasing surface, an axial length L and a large number of channels running from the lower end face to the upper end face, said process comprising:

a) vertically aligning the cylinder axis of the carrier structure and filling an empty volume in the channels with a coating suspension up to a predetermined filling height $H_1$ starting from the lower end face;

b) removing excess coating suspension through the lower end face of the carrier structure down to the first amount of target take-up;

c) turning the carrier structure 180° so that the upper end face and lower end face are exchanged one for the other; and d) repeating steps a) and b), wherein a filling height $H_2$ up to which the channels are filled in this case is given by $H_2 = L - x \cdot H_1$, where x is between 0.8 and 1.0 and when repeating step b) excess coating is removed down to the second amount of target take-up.

2. A process according to claim 1, wherein the filling of the empty volume in the channels up to filling heights $H_1$ and $H_2$ is performed by controlling the coating suspension volumetrically, gravimetrically or by means of a sensor with the aid of a metering device.

3. A process according to claim 2, wherein the metering device is a pump or a valve.

4. A process according to claim 1, wherein the removal of the excess coating in step b) is performed in one working stage under suction or by blowing out excess coating suspension.

5. A process according to claim 1, wherein the removal of the excess coating suspension in step b) is performed by pumping out followed by blowing out excess suspension or using suction.

6. A process according to claim 1, wherein the carrier structure is made of ceramic or metal.

7. A process according to claim 6, wherein the carrier structure is made of ceramic and a capacitive sensor is located at the heights $H_1$ and $H_2$ above the lower end face and at a distance from the encasing surface of the carrier structure for each coating height.

8. A process according to claim 1, wherein the rate at which the coating suspension is introduced into the carrier structure is such that the coating height required each time is reached in less than one second.

9. A process according to claim 1, wherein the coating is dried at elevated temperature after step d) and is calcined at temperatures from about 300° C. to about 600° C. to fix the coating to the carrier structure.

10. A process according to claim 9, wherein after step b) an intermediate drying is performed at an elevated temperature.

11. A process according to claim 1, wherein the composition of the coating suspension in step d) is a different from the one used in step a).

* * * * *